United States Patent
Aarhus

Patent Number: 5,617,641
Date of Patent: Apr. 8, 1997

[54] ADJUSTABLE LENGTH LEVEL

[76] Inventor: James A. Aarhus, 3624 W. Elgin St., Chandler, Ariz. 85226

[21] Appl. No.: 530,733

[22] Filed: Sep. 19, 1995

[51] Int. Cl.⁶ ........................................ G01C 9/26
[52] U.S. Cl. ................................. 33/374; 33/376
[58] Field of Search ............................. 33/374, 375, 376, 33/809

[56] References Cited

U.S. PATENT DOCUMENTS

| | | | |
|---|---|---|---|
| 686,360 | 11/1901 | Smiddy et al. | 33/374 |
| 1,413,056 | 4/1922 | Parrish et al. | 33/374 |
| 2,383,166 | 8/1945 | Seiwell | 33/376 |
| 2,551,524 | 5/1951 | Bullivant | 33/374 |
| 3,104,477 | 9/1963 | Edwill | 33/374 |
| 4,130,943 | 12/1978 | Talbot | 33/374 |
| 4,152,838 | 5/1979 | Cook | 33/342 |
| 4,435,908 | 3/1984 | Semler, Jr. | 33/376 |
| 4,607,437 | 8/1986 | McSorley, Sr. et al. | 33/374 |
| 4,733,475 | 3/1988 | Youmans | 33/372 |
| 4,894,925 | 1/1990 | Langmaid | 33/374 |
| 4,928,395 | 5/1990 | Good | 33/374 |
| 5,155,917 | 10/1992 | Townsend et al. | 33/374 |
| 5,249,365 | 10/1993 | Santiago | 33/374 |
| 5,412,875 | 5/1995 | Hilderbrandt | 33/374 |
| 5,433,011 | 1/1995 | Scarborough et al. | 33/376 |

FOREIGN PATENT DOCUMENTS

| | | | |
|---|---|---|---|
| 1064987 | 5/1954 | France | 33/374 |
| 2278918 | 12/1994 | United Kingdom | 33/376 |

*Primary Examiner*—Thomas B. Will
*Attorney, Agent, or Firm*—Patent & Trademark Services; Joseph H. McGlynn

[57] ABSTRACT

An infinitely adjustable level with a pair of extenders that extend out from opposite ends of a central body. The level vials can be attached to the extenders, to the central body, or to the extenders and the central body. In this manner the level vials will never be obscured as the extenders are adjusted, no matter what the length of adjustment might be. Also, this form of adjustment allows the level to be used where both ends must butt against objects and there is no way the level can overhang.

5 Claims, 1 Drawing Sheet

ADJUSTABLE LENGTH LEVEL

BACKGROUND OF THE INVENTION

This invention relates in general to carpenter's levels and in particular to levels that are adjustable in length.

DESCRIPTION OF THE PRIOR ART

In the prior art various types of adjustable levels are known. For example, U.S. Pat. No. 4,130,943 discloses an adjustable level which is extendible in 6 inch increments. U.S. Pat. No. 4,152,838 discloses a level with a sliding scale. U.S. Pat. No. 4,435,908 discloses an adjustable level with offset members to plumb warped studs. U.S. Pat. No. 4,607,437 discloses an adjustable level with extension legs that are extendible perpendicular to the longitudinal axis of the level. U.S. Pat. No. 4,733,475 discloses an extension level with a spring loaded member that allows the level to be retained in a wall opening. U.S. Pat. No. 4,928,395 discloses an extensible level in which the extenders are locked in longitudinal tracks on the level. U.S. Pat. No. 5,155,917 discloses a collapsible pocket level. U.S. Pat. No. 5,249,365 discloses a level with telescoping extenders. However all of the prior art levels suffer from various drawbacks. For example, the level in U.S. Pat. No. 4,130,943 is adjustable only in lengths of fixed increments. If the user wants a level of a length somewhere in between the fixed increments, the level is incapable of obtaining such a length.

SUMMARY OF THE INVENTION

The present invention provides an infinitely adjustable level with a pair of extenders that extend out from opposite ends of a central body. In one embodiment the level vials are attached only to the extenders and not to the central body. In a second embodiment the level vials are attached both to the extenders and the central body. In this manner the level vials will never be obscured as the extenders are adjusted, no matter what the length of adjustment might be. Also, this form of adjustment allows the level to be used where both ends must butt against objects and there is no way the level can overhang the opening.

It is an object of the present invention to provide an adjustable level which can be adjusted to any length.

It is an object of the present invention to provide an adjustable level which can be adjusted without obscuring the level vials.

It is an object of the present invention to provide an adjustable level which can be adjusted to fit within an opening that does not provide space for the level to overhang the opening.

It is an object of the present invention to provide an adjustable level which can be adjusted and when in the extended position the vials will be stable against relative movement.

These and other objects and advantages of the present invention will be fully apparent from the following description, when taken in connection with the annexed drawings.

DESCRIPTION OF THE PREFERRED EMBODIMENT

Figure 1:
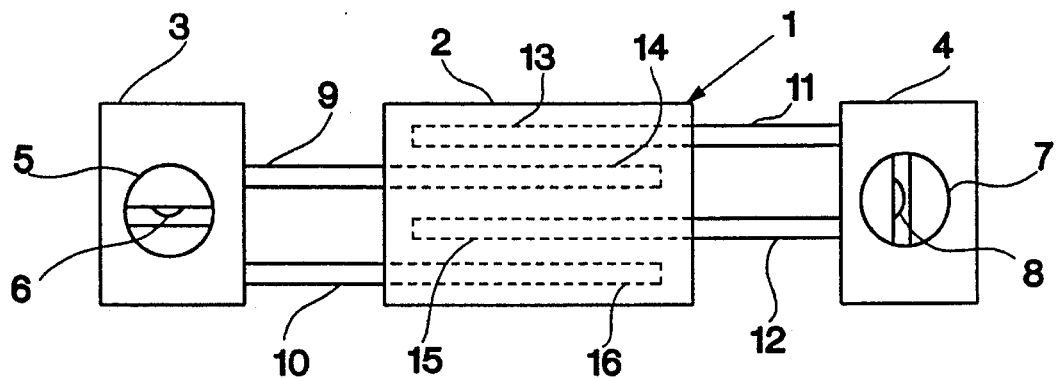
FIG. 1 is a side view showing one embodiment of the present invention.
Figure 2:
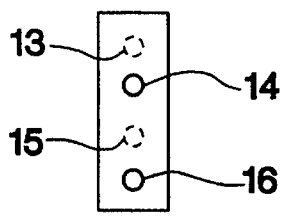
FIG. 2 is an end view of the left side of the main body of the present invention in FIG. 1.
Figure 3:
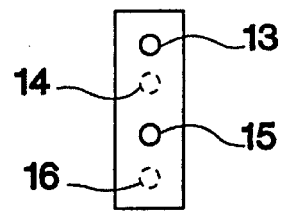
FIG. 3 is is an end view of the right side of the main body of the present invention in FIG. 1.

Referring now in greater detail to the drawings, FIG. 1 shows a view of the adjustable level 1 of the present invention. The level has a main body 2 with four shafts 13, 14, 15, and 16 extending into the ends of the main body (see FIGS. 2 and 3). The shafts 13 and 15 do not extend all the way through the main body, but rather stop short of the left end of the main body as seen in FIG. 1. The shafts 14 and 16 do not extend all the way through the main body, but rather stop short of the right end of the main body as seen in FIG. 1. The shafts are dimensioned to receive two pair of rods 9, 10, 11, and 12 with a close tolerance fit. This will allow the rods to slide within the shafts but they will remain in place through friction between the outside of the rods and the internal diameter of the shafts. The rods 9, 10, 11, and 12 are of a length that is slightly shorter than the longitudinal dimension of the main body, so when the end pieces 3 and 4 are pushed all the way toward the main body the end pieces will abut the ends of the main body 2. The length of the rods will allow the end pieces to extend approximately one half the length of the main body so when fully extended the level could be approximately twice as long as when it is in a closed position. That is, a level that measures approximately 2 feet when closed will measure approximately 4 feet when fully opened.

Each of the end pieces 3 and 4 will have a circular cut out 5 and 7 respectfully. Inside these cut outs will be placed level vials 6 and 8. It should be noted that a level vial 6 is shown in end piece 3 and a plumb vial 8 is shown in end piece 4, however two level vials or two plumb vials could be used at the same time depending on the operation the user wants to perform.

Also, since the rods 9, 10, 11, and 12 merely slide within the shafts 13, 14, 15, and 16 if one of the vials is broken a new end piece may be replaced without purchasing an entirely new level. Also, since the vials are placed only on the end pieces, no matter what position the end pieces are in the vials will be visible at all times.

Figure 4:
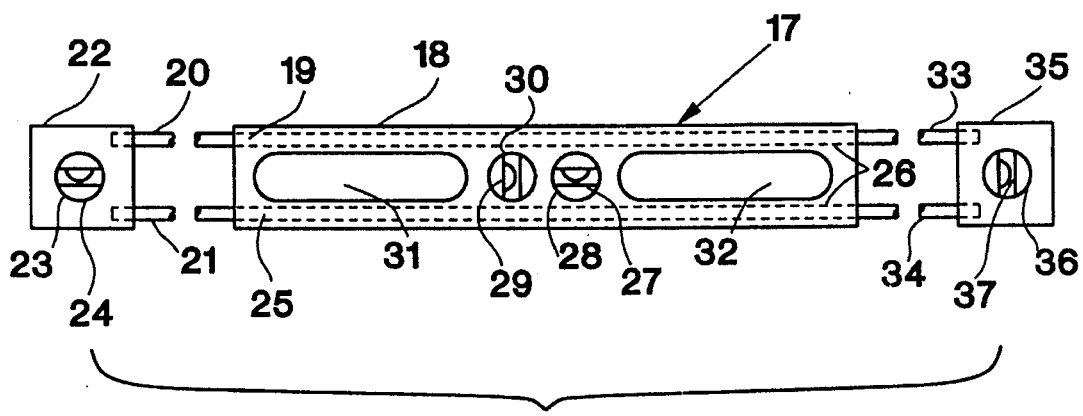
FIG. 4 is is a side view showing a second embodiment of the present invention.
Figure 5:
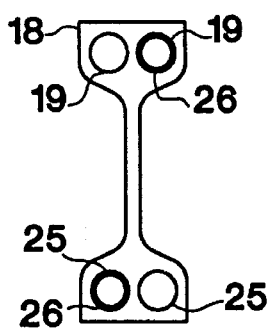
FIG. 5 is an end view of one side of the main body of the present invention in FIG. 4.

A second embodiment 17 of the present invention is shown in FIG. 4. In this embodiment there are two shafts 19 placed at the top of the main body 18 and two shafts 25 placed at the bottom of the main body 18 (as shown in FIG. 5). The shafts are placed side by side instead of being arranged vertically as in the FIG. 1 embodiment, and the shafts will extend the full length of the main body. The shafts will receive rods 20, 21, 33, 34, which will operate much the same as the shafts and rods in the FIG. 1 embodiment. Attached to the rods are end pieces 22 and 35 having cut outs 23 and 36 with level vials 24, 37 similar to those in the FIG. 1 embodiment. In addition cut outs 27 and 30 are provided in the main body 18 to hold additional level and plumb vials 28 and 29, respectfully. Since the rods are positioned in shafts 19 and 25 which are above the vials 28 and 29, the vials will not be obscured as the rods are moved in and out of the main body.

Also, the shafts can have bushings 26 placed inside to help hold the rods in whatever position they are placed. While only two bushings are shown in the drawings, it should be understood that a bushing may be placed in all of the shafts. The bushings can be used to renew the friction fit between the rods and the shafts as they wear from use. The bushings can be made from any material such as, but not limited to, metal or plastic.

Figure 6:
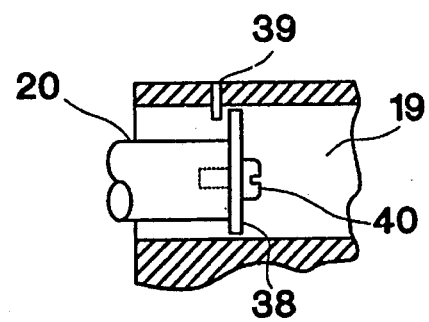
FIG. 6 is a partial view of a stop for rods of the present invention.

Also, as shown in FIG. 6, at least one of the rods, or all of the rods 20, 21, 33, 34, can have a stop member such as a disk 38 attached to the end of the rod by a screw or bolt 40. This stop member will engage a second stop member 39 secured in the shaft (for example shaft 19) to engage the first stop member 38 and prevent the unintentional separation of the end pieces from the main body. The second stop member can be a pin which is friction fit into an aperture in the main body.

Also, while the rods are shown as being circular in the drawings they can be made from any shape that will allow them to perform in the intended manner.

Although the adjustable length level and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. An extendible level device extendible between a closed position and a fully open position so that said level device has a first length in said closed position and a longer length in said fully open position comprising:

at least one body member, said body member having a first end and a second end, said body member having a top and bottom surface, said body member having at least four apertures, two of said at least four apertures extending into said first end of said body member, said two apertures extending completely through said body member, and another two of said at least four apertures extending into said second end of said body member, said another two apertures extending completely through said body member, at least a first and a second end member, means attached to said first and second end members and engaged with said apertures for slidably attaching said first and second end members to said first and second ends of said body member respectfully, level means attached to at least said first and second end members and said body member, said means for slidably attaching said first and second end members to said first and second ends of said body member is at least four rods, said rods being attached to said first and second end members at one end, and said rods being inserted into said apertures in said first and second ends of said body member at their other end, two of said rods being in a first vertical plane and another two of said rods being in a second vertical plane, said vertical planes being parallel, whereby, the effective length of said level device may be varied between said closed position and said fully open position.

2. The extendible level device as claimed in claim 1, wherein said body member is I-shaped in cross-section.

3. The extendible level device as claimed in claim 1, wherein said body member has a pair of level means attached thereto.

4. The extendible level device as claimed in claim 1, wherein at least one of said at least four apertures in said body member has a bushing mounted therein.

5. The extendible level device as claimed in claim 1, wherein at least one of said rods has a stop means attached thereto which cooperates with another stop means positioned in at least one of said apertures, whereby said stop means will cooperate to prevent unintentional separation of said rods from said extendible level device.

* * * * *